No. 886,633. PATENTED MAY 5, 1908.
W. PLATZ.
VALVE.
APPLICATION FILED APR. 19, 1907.

2 SHEETS—SHEET 1.

No. 886,633.

PATENTED MAY 5, 1908.

W. PLATZ.
VALVE.
APPLICATION FILED APR. 19, 1907.

2 SHEETS—SHEET 2.

UNITED STATES PATENT OFFICE.

WILHELM PLATZ, OF WEINHEIM, GERMANY.

VALVE.

No. 886,633.  Specification of Letters Patent.  Patented May 5, 1908.

Application filed April 19, 1907. Serial No. 369,049.

*To all whom it may concern:*

Be it known that I, WILHELM PLATZ, a subject of the Grand Duke of Baden, residing at 27 Bahnhofstrasse, Weinheim, in the Grand Duchy of Baden and Empire of Germany, have invented new and useful Improvements in Valve-Gears, of which the following is a specification.

My invention relates to improved valve gear more particularly designed for steam engines. The valves are loose upon the rods which move them, and are carried away by collars or the like provided on these rods, for the closing and opening. Springs are arranged between the valves and collars for closing the valves.

Figure 1:
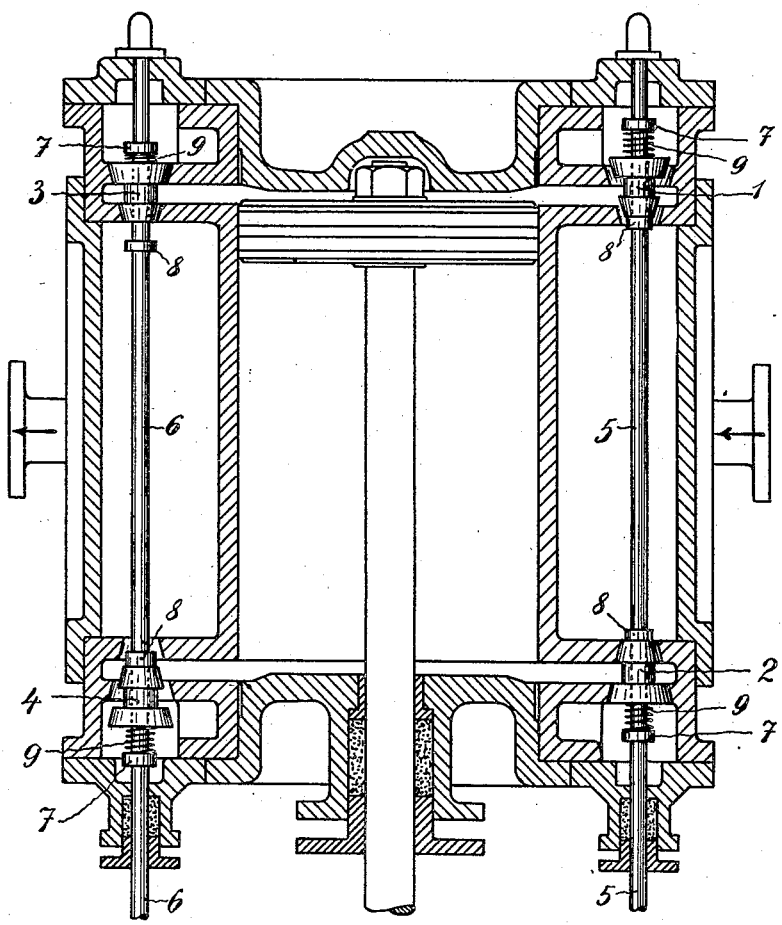
Figure 2:
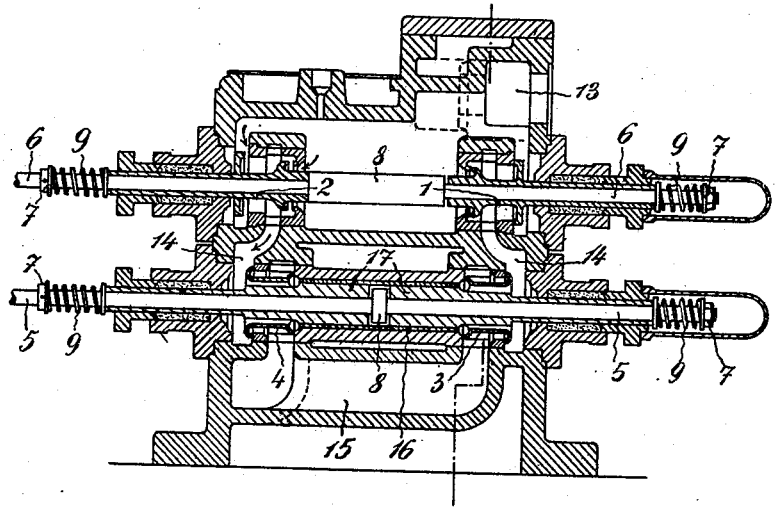
Figure 3:
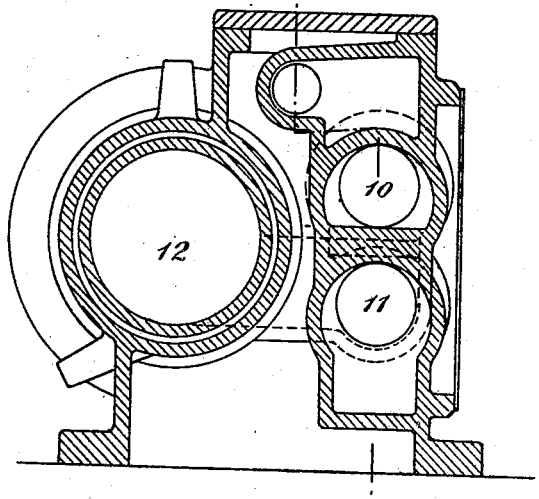

In the accompanying drawings Figure 1 is a diagram of this valve gear applied to a steam engine cylinder, in which the steam inlet is on one side and the steam outlet on the other side. Figs. 2 and 3 are a longitudinal section and a transverse section respectively of a steam engine cylinder provided with the improved valve gear.

The valves 1, 2, 3, 4, Fig. 1, are loose upon the rods 5, 6 by which they are moved. Upon these rods are collars 7, 8 designed for opening and closing the valves. Between the collars 7 which close the valves and the valves themselves I arrange springs 9.

In the steam engine cylinder represented in Fig. 1, the steam inlet is situated on the right-hand side, and the steam outlet on the left-hand side. The rod 6 carrying the outlet valves 3 and 4 is firmly connected with the valve mechanism (not represented), while the rod 5 carrying the inlet valves 1 and 2 may be moved by means of a link or a shaft governor, in order to obtain a variable expansion.

The springs 9 permit of a continued movement of the rods 5 and 6 when the valves have already reached their seatings. Moreover, the springs 9 permit of the lead of one valve with respect to another, and a spring at one end of the rod acts as a buffer for the collar provided at the other end and designed for the opening.

In the constructional form illustrated in Figs. 2 and 3 the valve chambers 10, 11 are arranged in close proximity one above the other by the side of the cylinder 12. The valves, collars and springs are designated by the same numerals as in Fig. 1. The steam inlet takes place at 13. A single collar 8 is furnished on each rod 5 and 6 between the valves 1, and 2 or 3 and 4 for opening the valves at both ends. For the closing use is made of nuts or collars 7. Through the inlet ports 14 the steam passes from the inlet valves 1 and 2 into the engine cylinder 12, and from this cylinder back to the outlet valves 3 and 4. The exhaust port is designated by 15.

By lengthening the collar 8 upon the rod 5 its faces may be brought nearer to the valve seats. The sleeve 16, instead of forming a joint on the extensions 17 of the valves 3 and 4, has then to make the joint on the lengthened collar 8.

The above-described construction of the valve gear may be used for horizontal as well as for vertical cylinders.

It will be understood that the arrangement of the valves on the cylinders is not restricted to the constructional forms shown by way of example, but may be modified at will, provided that the valves are loose upon the rods which move them, and that they are opened and closed by collars or the like fixed upon the rods. It is also possible to arrange all four valves one behind the other upon a single rod, which however has the drawback that a change in the angle of throw or lead, for instance through a shaft governor, will cause all four critical points of the diagram to be changed.

What I claim as my invention, and desire to secure by Letters Patent, is—

1. In a valve gear of the character described, the combination with two single-piece double-valves of a valve-rod having collars fixed on both sides of each of the valves, and adapted to open and close the same, the valves being loose upon the rod and fitted to slide thereon between the pairs of collars.

2. In a valve gear of the character described, the combination with two single-piece double-valves of a valve-rod having collars fixed on both sides of each of the valves, the valves being loose upon the rods and adapted to slide thereon between the pairs of collars, and springs interposed between one side of the valves and the collar for closing such valves.

3. In a valve gear of the character described, a valve-rod having a collar fixed in the middle and a collar fixed at either end, two single-piece double-valves loosely mounted upon the valve rod, and fitted to slide one on each side of the middle collar, the middle collar being adapted to open the two valves, and springs interposed between the outer collars and the valves adapted to close such valves.

4. In an engine, a cylinder fluid pressure chamber and exhaust chamber extending from end to end thereof, each having an auxiliary chamber in communication therewith at either end, separated partly from the main chamber by a partition having a fluid passage extending across such chambers in communication with the cylinder at the end, and on one side by a main chamber port with the main fluid chamber and on the other with the auxiliary fluid chambers by an auxiliary chamber port, single-piece double-valves located in each pair of adjacent main and auxiliary fluid chamber ports opening into the auxiliary fluid chambers, a valve rod passing through each of the main chambers through its valves in such manner, that the valves will reciprocate thereon, means carried on the central portion of the valve rods for forcing the valves into the auxiliary chambers so as to open the same when the rods are reciprocated in the proper direction, a collar secured on each valve rod within each auxiliary fluid chamber for closing the valves, and a spring interposed between each of such collars and the valve.

In testimony whereof I have signed my name to this specification in the presence of two subscribing witnesses.

WILHELM PLATZ.

Witnesses:
  H. W. HARRIS,
  JOS. H. LEUTE.